March 19, 1957    J. J. KROGEN    2,785,708
POWER SAW MOUNTING FOR SAWING PLYWOOD AND LIKE SHEET MATERIAL
Filed Jan. 3, 1956    3 Sheets-Sheet 1

INVENTOR.
JULIUS J. KROGEN,
BY
AGENT.

March 19, 1957  J. J. KROGEN  2,785,708
POWER SAW MOUNTING FOR SAWING PLYWOOD AND LIKE SHEET MATERIAL
Filed Jan. 3, 1956  3 Sheets-Sheet 2
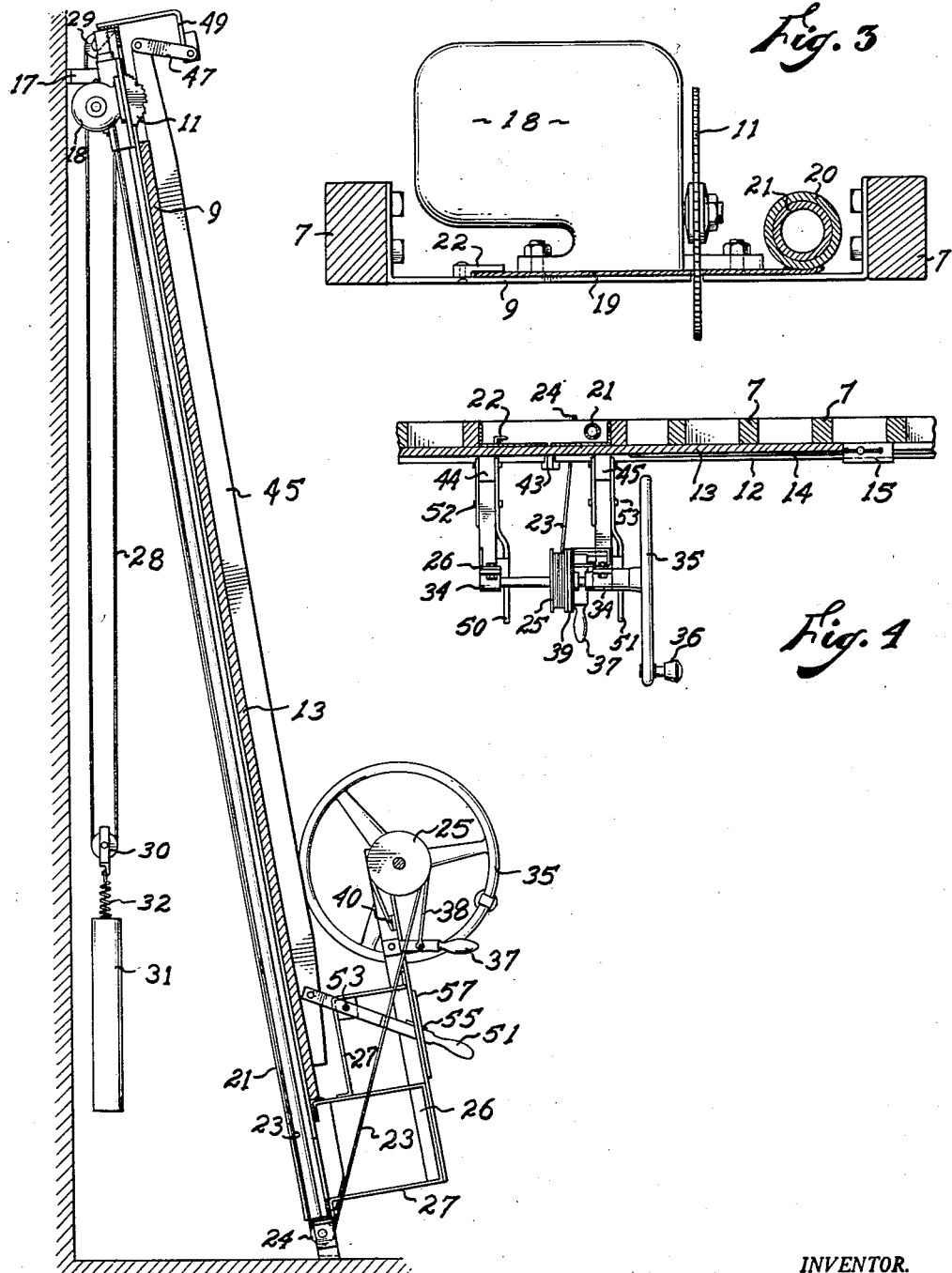
INVENTOR.
JULIUS J. KROGEN,
BY
AGENT March 19, 1957 J. J. KROGEN 2,785,708
POWER SAW MOUNTING FOR SAWING PLYWOOD AND LIKE SHEET MATERIAL
Filed Jan. 3, 1956 3 Sheets-Sheet 3
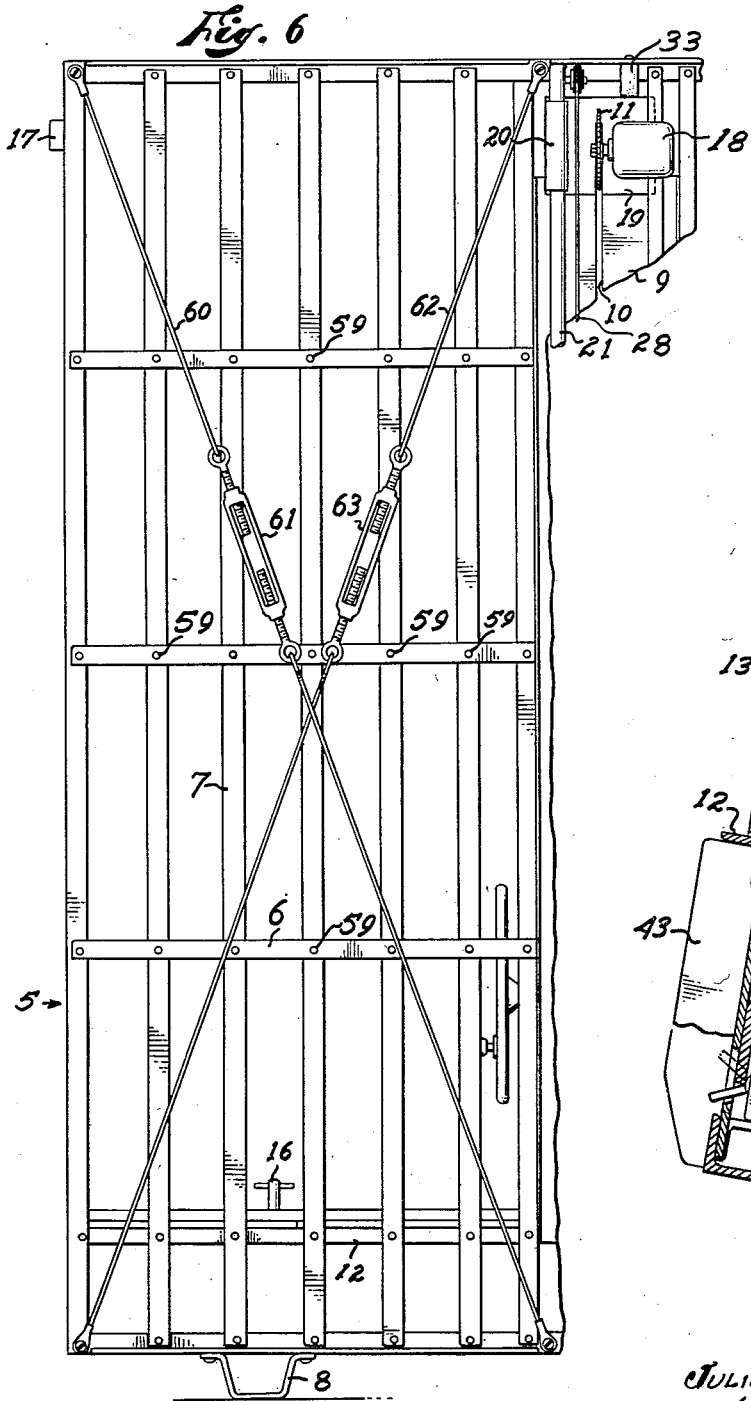
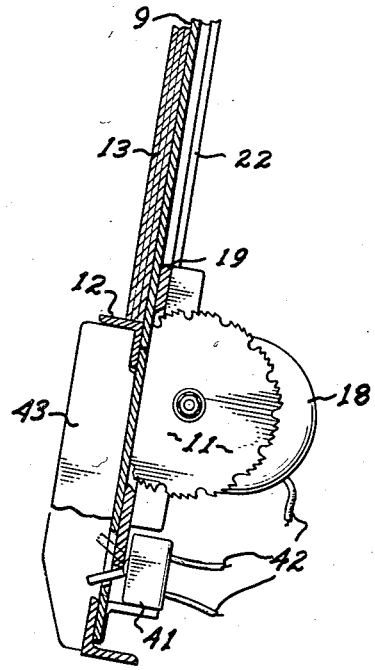
INVENTOR.
JULIUS J. KROGEN,
BY
AGENT United States Patent Office 2,785,708
Patented Mar. 19, 1957

2,785,708

POWER SAW MOUNTING FOR SAWING PLYWOOD AND LIKE SHEET MATERIAL

Julius J. Krogen, Anaheim, Calif.

Application January 3, 1956, Serial No. 556,923

3 Claims. (Cl. 143—47)

This invention relates to mountings for power-saws and more particularly relates to a saw-mounting, including a table or support, on which large panels such as pieces of plywood or cement board may be cut to accurate measurements.

In many lumber-yards, when a customer desires a piece of plywood, say eight feet by one foot, it is the custom to assign two employees to handle the larger sheet from which the piece is to be cut. The larger sheet may be handled easily by one man when held in a vertical plane, but requires two men on opposite edges when held in a horizontal plane. When in a horizontal plane, the piece must be held by various blocks and guides to keep it from slipping sideways, whereas in a vertical plane the weight of the piece will materially assist in holding the piece firmly. Furthermore, to adjust the blocks and guides for a horizontally-held work-piece generally involves walking around the table on which the work-piece is held and shifting the work-piece and the blocks until the desired adjustment is effected.

It is an object of this invention to provide a saw-mounting for sawing plywood sheets and similar materials which will save a large amount of the labor now expended in such operations.

A further object of the invention is to provide a work-supporting table or stand which is slightly inclined from the vertical, so as to receive a work-piece of plywood carried and placed in position by one man, and which may be transported easily around a lumber-yard and leaned against any convenient building or wall.

Still another object of the invention is to provide a system of controls for the saw and for the plywood, all at a convenient height and positioned directly in front of an operator's station so that one man can easily accomplish the entire operation.

A further object of the invention is to provide a saw-mounting having controls governing the speed at which the saw travels, when working or on the return stroke, and having automatic switching arrangements for shutting off the saw at the end of its power stroke.

In the accompanying drawings, illustrative of a presently preferred embodiment of my invention and not intended to be limiting thereof, Fig. 1 is a front elevational view of my improved saw-mounting;

Fig. 2 is a vertical sectional view on the line 2—2 of Fig. 1;

Fig. 3 is an enlarged fragmentary horizontal sectional view on the line 3—3 of Fig. 1;

Fig. 4 is fragmentary horizontal sectional view on the scale of Figs. 1 and 2, and on the line 4—4 of Fig. 1.

Fig. 5 is an enlarged fragmentary sectional view on the line 5—5 of Fig. 1, but with the saw shown at the bottom of its course, and in position to operate a cut-off switch; and Fig. 6 is a rear elevational view of part of the frame.

Figure 1:
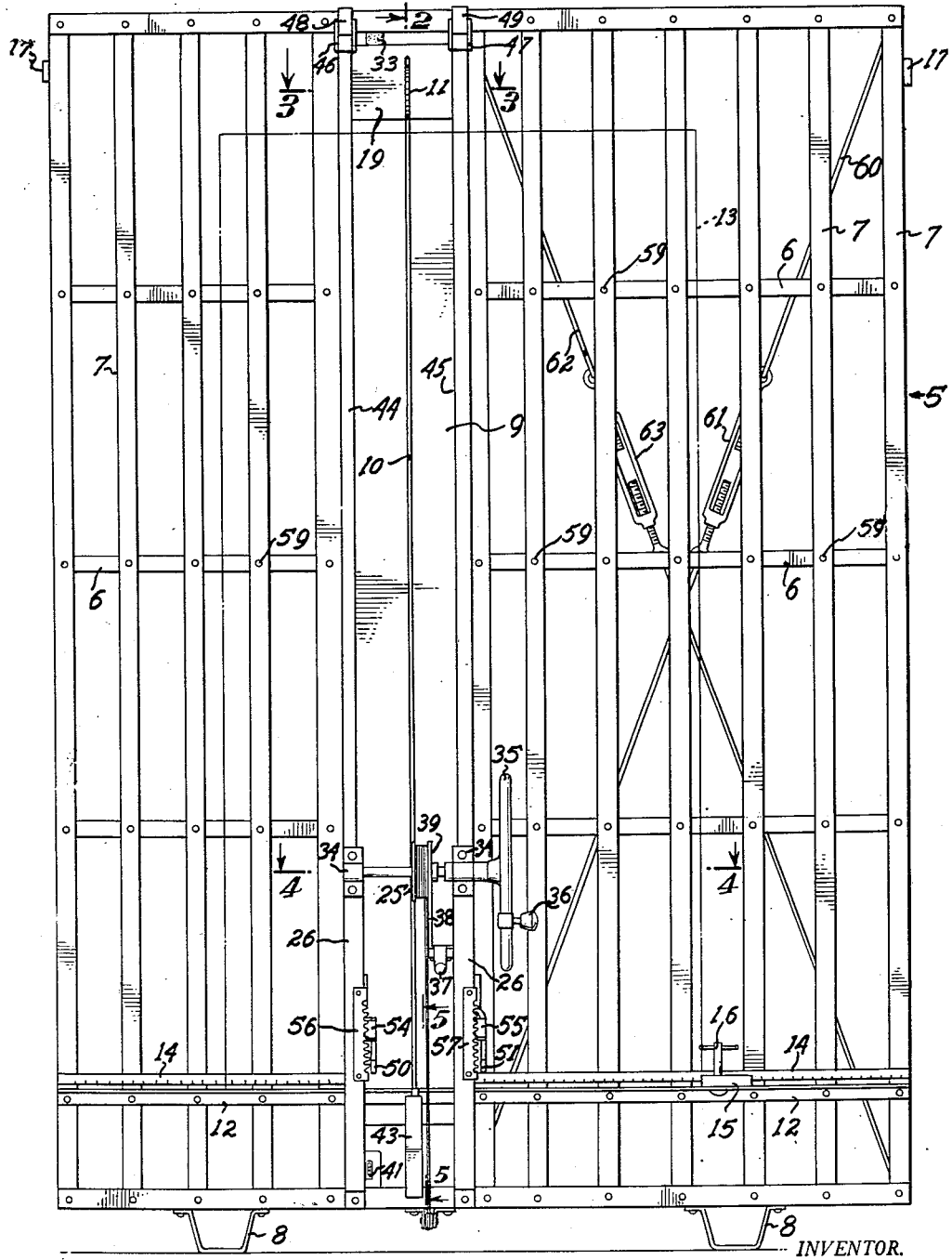

Having reference now to the details of the drawings, a frame 5 of horizontal and vertical members 6 and 7 is supported on feet 8 when in a vertical or nearly vertical position. At approximately the center of the frame 5 is a vertical split panel 9, having a vertical slot 10. A rotary saw blade 11, hereinafter more fully described, is mounted to extend through the slot 10. Adjacent the bottom of the slot 10 and on each side thereof, but separated to permit the saw 11 to descend between them, are bracket shelves 12 on which a piece of plywood 13 may be supported. Above the bracket shelves 12 are horizontal rulers 14, which may be secured to the vertical members 7, for measurement from the slot 10 to either edge of the plywood piece 13. A block 15 slides upon the shelves 12 and may be secured in any desired position by a clamp 16. If a piece of plywood is placed on the shelves 12 and leaned against the frame 5, with its edge against the block 15, the saw 11 will cut therefrom a piece equal in width to the measured distance between the slot 10 and the block 15. Rests 17 are provided at the top of the frame 5 to hold the frame spaced from a supporting wall.

The saw 11, with a motor 18 to turn it, is mounted on a plate 19 which is slidable vertically against the rear side of the split panel 9. One vertical edge of the plate 19 is provided with a short vertical length of pipe 20 (Figs. 3 and 6), through which extends a vertical post 21, the post 21 being coextensive with the possible length of travel of the saw 11 and being secured at its top and bottom to the panel 9. The opposite vertical edge of the plate 19 is contained slidably under an offset rail 22, similarly extending and similarly secured.

To cause the saw 11 to move up and down, there is provided a cable or wire 23 secured to the plate 19 and extending downward to a pulley 24 and thence upward to a windlass 25 (Figs. 2 and 4) mounted on posts 26 offset from the front of the panel 9 by brackets 27. A similar cable or wire 28, secured to the top of the plate 19 extends upwardly over a pulley 29 and then downwardly to a pulley 30 from which is suspended a counter-weight 31 by means of a spring 32 and then upwardly again to the top of the panel 9 where it is suitably secured. When the cable 23 is wound upon the windlass 25, the plate 19 with its attached saw 11 and motor 18 is moved downwardly, the saw extending through the slot 10. When the windlass 25 is released, the counter-weight 31 will pull the plate 19 upwardly. Upward movement of the plate 19 is terminated by a rubber bumper 33 (Fig. 1) secured to the top of the frame 5.

The windlass 25 is mounted in bearings 34 and may have a wheel 35 and handle 36, for ease in turning. A lever 37 is pivotally secured to one of the posts 26 and has one end of a brake band 38 secured to it, the brake band 38 passing over a brake drum 39 on the windlass axle and having its other end secured to the same post 26, as at 40. The brake band, having one end secured to the fixed post 26 and its other end secured to the movable lever 37, will yield when the rotation of the drum 39 is towards the end secured to the post, as the frictional pull on it will tend to lift the lever and release the band. But when rotation of the drum 39 is towards the lever, the band is tightened on the drum by such rotation. The wheel 35, cable 23 and windlass 25 are arranged to rotate in the first-described direction to pull the saw downward—that is, to rotate with the minimum of brake-resistance—and to rotate in the latter direction when the saw moves upward. The weight of the lever may easily be adjusted so that it will automatically hold the saw 11 at any point when the wheel 35 is released, a slight lift on the lever then releasing the band 38 and permitting the saw to rise at a controlled speed.

The spring 32, on which the counter-weight 31 is suspended, helps materially in the automatic action of the brake band 38. The spring 32 will yield slightly when the brake band 38 takes hold, and the saw may thus be stopped in its rise at an exact point, instead of over-running it.

Adjacent the foot of the panel 9, at a position where it may be operated by the descending plate 19 or by some attachment thereto, is a switch 41 in the electric circuit to the motor 18 (see Fig. 5). Suitable flexible wires 42 conduct electricity from any suitable source of power to the switch 41, and from the switch to the motor 18, being shown in the drawings only as they connect to the switch 41. The switch 41 may be manually operated when the motor is at the top of the panel 9; it is automatically turned off by contact with the lower edge of the plate 19 when the plate reaches the low limit of its descent. Ordinarily, the operator will let the descending plate turn off the switch 41 and will turn it on again when the saw 11 is again at the top of the panel 9, and the operator has the apparatus ready to make a new cut. To protect the operator if it becomes necessary to manipulate the switch 41 when the saw is at the bottom of the stroke, a guard 43 covers that portion of the slot 10 extending below the shelves 12.

A pair of clamp bars 44 and 45 are secured by pivoted links 46 and 47 to brackets 48 and 49 extending forwardly from the top of the panel 9. The lower ends of the clamp bars 44 and 45 extend nearly to the shelves 12. Levers 50 and 51 having their fulcrum pivots 52 and 53 secured to the brackets 27, are pivotally secured to the lower ends of the clamp bars 44 and 45 so as to hold the clamp bars parallel to the panel 9, and have their handle ends provided with sideways extending detents 54 and 55 (Fig. 1) which are engageable with ratchets 56 and 57 mounted on the posts 26. The links 46 and 47 incline upwardly from the brackets 48 and 49 to their points of engagement with the clamp bars 44 and 45, and the levers 50 and 51, between the fulcrum pivots 52 and 53 and the clamp bars, are of the same length as the links and parallel thereto. Consequently, lifting the levers 50 and 51 by the handles thereto swings the clamp bars 44 and 45 inwardly toward the panel 9 while maintaining them parallel to the panel. The detents 54 and 55, engaging the ratchets 56 and 57, prevent the lever handles from falling. A plywood piece, placed on the shelves 12 between the clamp bars 44 and 45 and the frame 5 and adjusted laterally against the block 15, may be clamped in place by simply pulling up on the levers and engaging the detents thereof in the respective ratchets. The ratchets provide for wide selectivity, allowing for differences in the thickness of different pieces of plywood. It will be noticed that the swinging movement of the bars 44 and 45, into clamping position, is downward as well as inward, due to the upward inclination of the links 46 and 47 and the levers 50 and 51. The work-piece is thus not only clamped against the frame 5, but is forced downward into place upon the shelves 12.

Because it is desirable to have the frame 5 portable, it is preferably made of light materials, the horizontal and vertical members 6 and 7 being of wood rather than metal. A frame 5 so constructed has not the rigidity of a metal frame but at the same time it yields more readily to minor adjustments and can be brought back to shape after being mishandled. The horizontal member 6 and the vertical members 7 are secured to one another at each intersection by single bolts 59, and consequently the frame 5 has a certain amount of diagonal yielding in the nature of a scissors action. To control this yielding and to afford what amounts to micrometer adjustment, a wire 60 extends from one upper corner of the frame 5 diagonally downward to a turnbuckle 61 and then continues to the lower adjacent corner of the panel 9 where it is secured. A second wire 62 extends diagonally upward from the corresponding lower corner of the frame 5 to a turnbuckle 63 and then continues to the upper adjacent corner of the panel 9 where it is secured. By adjustment of the turnbuckles 61 and 63, the frame 5 can be brought to a true rectangle in which the slot 10 is perpendicular to the shelves 12, or it can be warped slightly out of true for the purpose of cutting a piece of plywood to match exactly another piece which is not perfectly rectangular.

With my new improved saw mounting, an operator desiring to cut a piece from a plywood panel (a plywood panel, by custom, measures 8 feet by 4 feet) leans the frame 5 against a supporting wall, connects the device to a source of power, and places the panel upon the shelves 12. Having adjusted the panel to the desired measurement by the rulers 14 and block 15, he swings the levers 50 and 51 upwardly until the clamp-bars 44 and 45 are tight against the panel, and engages the detents 54 and 55 to the ratchets 56 and 57. He then lifts the switch 41 to start the motor 18, and turns the windlass 25 to draw the saw 11 downwardly through the slot 10 into the work. He may stop the saw at any point, for example to inspect the cut, by simply stopping the windlass. He may even leave the work; the automatic action of the brake band 38 will hold the saw at the point at which he left it. If the cut goes to the bottom of the slot 10, the switch 41 automatically stops the saw 11, and no damage results from over-winding on the windlass. Releasing the windlass and partly releasing the brake lever 37, he permits the saw to be drawn up above the work by the counter-weight 31. The cut pieces become removable by releasing the levers 50 and 51. As the ordinary full panel may easily be manipulated by one man when held vertically, the operation of sawing such a panel becomes a one-man job.

I claim:

1. A mounting for a rotary power saw comprising a frame adapted to be inclined against a support, a panel in said frame having a slot, said panel and said slot extending in upright direction when said frame is so inclined, a saw mounted for movement within said slot, a counter-weight arranged to urge said saw to the uppermost part of said slot, a windlass and a cable attached to said saw for pulling said saw downwardly against the resistance of said counter-weight, a shelf on the front of said frame adjacent the lower end of said slot for supporting a work-piece, a clamping bar for clamping a work-piece against said frame, links pivotally connected to said clamping bar and arranged to swing said bar towards and away from said frame while maintaining said clamping bar parallel to said frame, one of said links being extended to form a lever handle, and means for holding said lever handle in selected positions in which said clamping bar may clamp work-pieces of differing thicknesses.

2. A mounting for a saw as set forth in claim 1, including braking means for offsetting the action of said counter-weight when said windlass is released.

3. A mounting for a saw as set forth in claim 1, in which said saw is electrically revolved and including a switch operable by the proximity of said saw to the bottom of said slot for stopping the revolution of said saw.

References Cited in the file of this patent

UNITED STATES PATENTS

| | | |
|---|---|---|
| 2,347,359 | Miller | Apr. 25, 1944 |
| 2,396,961 | Meredith | Mar. 19, 1946 |
| 2,613,707 | Giles | Oct. 14, 1952 |
| 2,711,194 | Fisher | June 21, 1955 |
| 2,741,277 | Leger | Apr. 10, 1956 |

FOREIGN PATENTS

| | | |
|---|---|---|
| 473,491 | Great Britain | Oct. 14, 1937 |